(12) United States Patent
Chang

(10) Patent No.: US 7,107,059 B2
(45) Date of Patent: Sep. 12, 2006

(54) SYSTEM AND METHOD FOR MANAGING QUALITY OF SERVICE OF MOBILE TERMINAL

(75) Inventor: Chia-Lan Chang, Taipei (TW)

(73) Assignee: Institute For Information Industry, Taipei (TW)

( * ) Notice: Subject to any disclaimer, the term of this patent is extended or adjusted under 35 U.S.C. 154(b) by 565 days.

(21) Appl. No.: 10/400,663

(22) Filed: Mar. 28, 2003

(65) Prior Publication Data
US 2004/0203417 A1    Oct. 14, 2004

(51) Int. Cl.
*H04Q 7/20* (2006.01)

(52) U.S. Cl. .................. 455/450; 455/452.1; 455/67.7; 455/452.2; 455/458; 455/67.11; 370/252; 370/310.2; 370/328; 370/338; 370/352

(58) Field of Classification Search ............. 455/450, 455/458, 452.2, 67.7; 370/252, 328, 331, 370/338, 352
See application file for complete search history.

(56) References Cited

U.S. PATENT DOCUMENTS

| | | | | |
|---|---|---|---|---|
| 5,822,309 A * | 10/1998 | Ayanoglu et al. | ........... | 370/315 |
| 5,970,062 A * | 10/1999 | Bauchot | ................... | 370/310.2 |
| 6,198,728 B1 * | 3/2001 | Hulyalkar et al. | ........ | 370/310.1 |
| 6,603,975 B1 * | 8/2003 | Inouchi et al. | .............. | 455/450 |
| 6,654,363 B1 * | 11/2003 | Li et al. | ..................... | 370/338 |
| 6,674,765 B1 * | 1/2004 | Chuah et al. | ................ | 370/458 |
| 6,711,141 B1 * | 3/2004 | Rinne et al. | ................. | 370/328 |
| 6,765,909 B1 * | 7/2004 | Sen et al. | .................... | 370/392 |
| 6,813,278 B1 * | 11/2004 | Swartz et al. | ............... | 370/466 |
| 6,888,808 B1 * | 5/2005 | Jagadeesan et al. | ........ | 370/328 |
| 6,894,985 B1 * | 5/2005 | Billhartz | ...................... | 370/252 |
| 6,934,297 B1 * | 8/2005 | Bensaou et al. | ............ | 370/445 |
| 6,954,435 B1 * | 10/2005 | Billhartz et al. | ............ | 370/252 |

* cited by examiner

*Primary Examiner*—Marceau Milord
(74) *Attorney, Agent, or Firm*—Bacon & Thomas, PLLC

(57) ABSTRACT

Disclosed are a system and a method for managing quality of service (QoS) of a mobile terminal. A wireless quality management unit is able to read QoS parameters and data from a wireless communication protocol unit and reports the same to a man machine interface (MMI) unit or upper layer unit so as to provide QoS services subsequently. The invention enables a user or upper layer software to effectively, efficiently, and flexibly utilize wireless interface communication.

6 Claims, 2 Drawing Sheets

SYSTEM AND METHOD FOR MANAGING QUALITY OF SERVICE OF MOBILE TERMINAL

BACKGROUND OF THE INVENTION

1. Field of the Invention

The present invention relates to the technical field of Quality of Service (QoS) management in wireless communication and, more particularly, to a system and a method for managing QoS of a mobile terminal.

2. Description of Related Art

Conventionally, the software of a mobile terminal cannot report QoS or related measurement data of wireless interface communication software. Furthermore, the mobile terminal is unable to manage or monitor QoS of the wireless interface communication software. Instead, QoS used by the wireless interface communication software must be sent to the network and then sent back to the mobile terminal, so that an upper layer (e.g., application layer) can obtain the actual QoS. In view of the above, the upper layer cannot know wireless communication resource in real time, resulting in an inefficiency due to retransmission, a low data transfer rate, or the like. Moreover, the user cannot change settings of the wireless interface communication software even there is a need. In other words, the setting of the wireless interface communication software is unchangeable, resulting in a lack of flexibility.

Therefore, it is desirable to provide a novel system and method for managing QoS of a mobile terminal in order to mitigate and/or obviate the aforementioned problems.

SUMMARY OF THE INVENTION

The object of the present invention is to provide a system and a method for managing quality of service of a mobile terminal so as to enable a user or upper layer software to effectively, efficiently, and flexibly utilize wireless interface communication.

In one aspect of the present invention there is provided a system for managing quality of service (QoS) of a mobile terminal, which comprises: a man machine interface (MMI) unit for operating the mobile terminal; an upper layer unit coupled to the MMI unit for supporting at least one network protocol; a wireless communication protocol unit for supporting at least one QoS service to obtain QoS parameters and data; and a wireless quality management (WQM) unit coupled to the wireless communication protocol unit, the MMI unit, and the upper layer unit respectively for receiving the QoS parameters and data and sending the same to the MMI unit or the upper layer unit in real time, so as to process the at least one QoS service.

In another aspect of the present invention, there is provided a method for managing QoS of a mobile terminal, which comprises the steps of: (A) sending a QoS request to a network for requesting the network to provide a first QoS; (B) if the network can not provide the first QoS, performing a channel analysis by a second QoS evaluated and set by the network for obtaining a channel analysis result and executing step (D); (C) if the network can provide the first QoS, the mobile terminal performing the channel analysis based on a wireless interface channel configuration corresponding to the first QoS for obtaining a channel analysis result; and (D) entering into a QoS management state until an end of service request is received.

Other objects, advantages, and novel features of the invention will become more apparent from the detailed description when taken in conjunction with the accompanying drawings.

DETAILED DESCRIPTION OF THE PREFERRED EMBODIMENT

Figure 1:
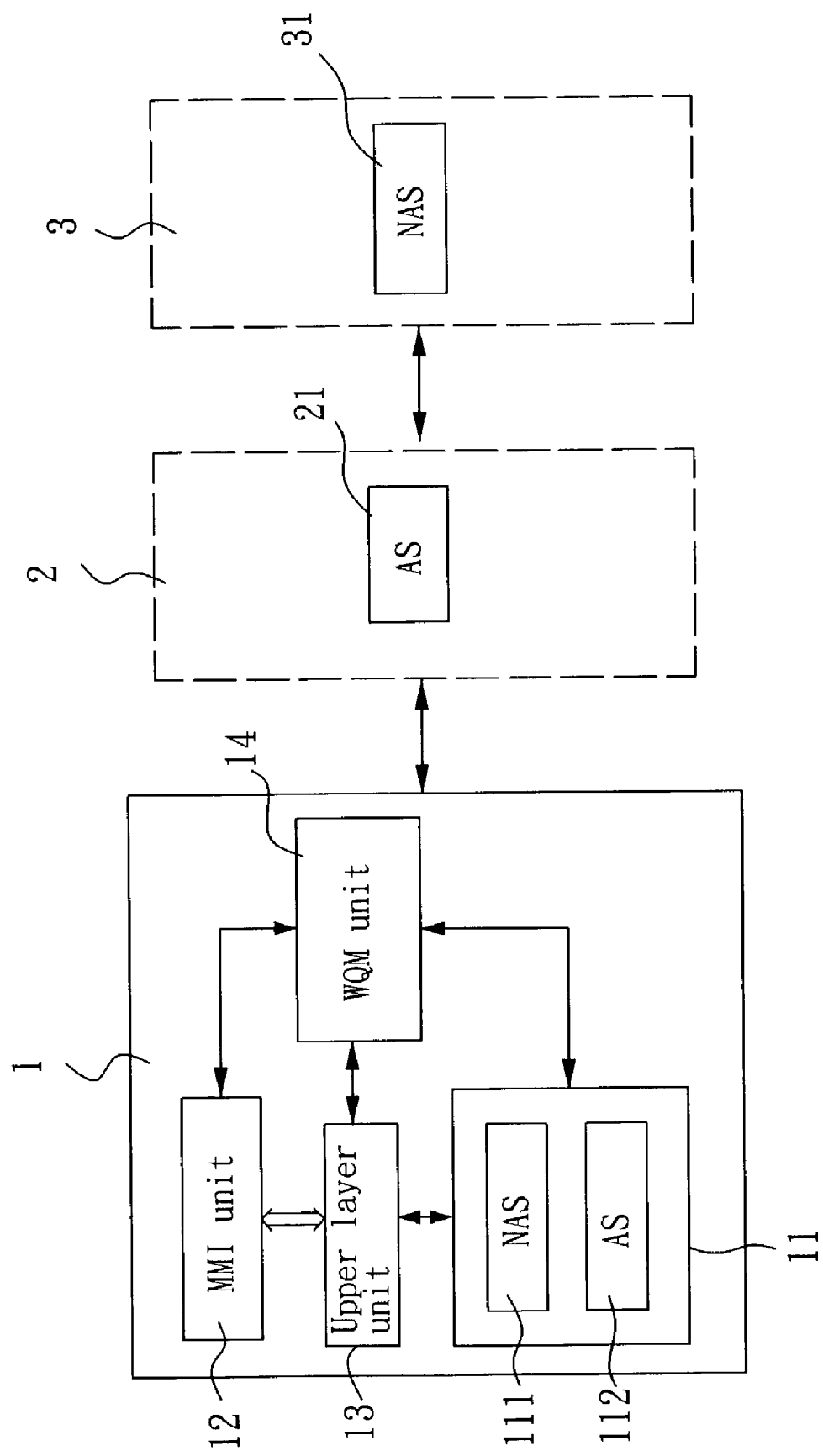
FIG. 1 is a block diagram of a system for managing QoS of a mobile terminal according to the present invention.

With reference to FIG. 1, there is shown a system constructed in accordance with the invention comprising a mobile terminal 1, a wireless access network 2, and a core network (CN) 3. The mobile terminal 1 includes a wireless communication protocol unit 11, a man machine interface (MMI) unit 12, an upper layer unit 13, and a wireless quality management (WQM) unit 14. The wireless communication protocol unit 11 includes a non-access stratum (NAS) 111 and an access stratum (AS) 112.

In this embodiment, the upper layer unit 13 is an upper layer software for supporting at least one network protocol such as Transmission Management Protocol (TCP), User Datagram Protocol (UDP), Simple Mail Transfer Protocol (SMTP), File Transfer Protocol (FTP), or Internet Protocol (IP). The wireless communication protocol unit 11 supports at least one wireless communication protocol and is able to set wireless communication channels and transmission modes. Furthermore, the wireless communication protocol unit 11 is able to manage routes and user identifications and help the upper layer unit 13 to provide services.

The WQM unit 14 is coupled to the wireless communication protocol unit 11, the MMI unit 12, and the upper layer unit 13 respectively. Hence, the WQM unit 14 is able to request the AS 112 to report QoS parameters and measuring data of a wireless interface communication software to the WQM unit 14. Also, the WQM unit 14 can request the NAS 111 to report QoS parameters and measuring data of the NAS 111. The upper layer unit 13 or the MMI unit 12 may set the NAS 111 via the WQM unit 14. As a result, the purpose of enabling a user or upper layer software to effectively, efficiently, and flexibly utilize wireless interface communication can be achieved.

Because formats regarding the representation of QoS may be different among these layers, the WQM unit 14 is implemented as a fuzzy or neural network for comparing QoS of one layer with that of the other layer.

Figure 2:
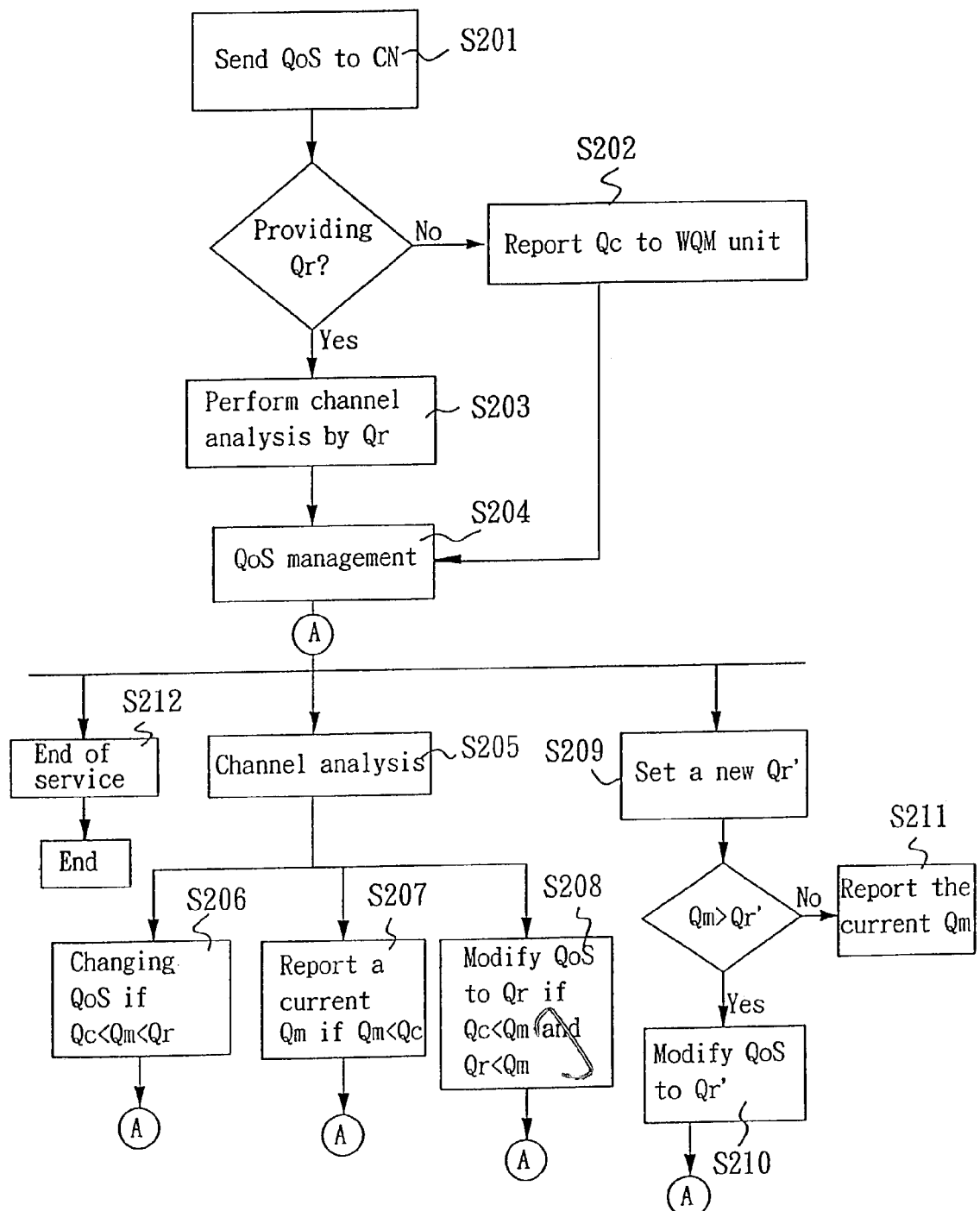
FIG. 2 is a flowchart showing a method for managing QoS of a mobile terminal according to the present invention.

With reference to FIG. 2, there is shown a flowchart showing a sequence of steps performed by the system. In step S201, the upper layer unit 13 or the MMI unit 12 may submit a QoS request (Qr) to the WQM unit 14. The Qr is then sent from the WQM unit 14 to the NAS 111 and the NAS 31 of the CN 3 respectively. Next, the CN 3 inquires the wireless access network 2 whether to provide QoS to the mobile terminal 1.

If the wireless access network 2 cannot achieve the QoS request (for example, the provided transmission rate is lower than Qr), the CN 3 informs the NAS 111 about a QoS setting (Qs) evaluated by the CN 3. The wireless access network 2 then configures the AS 112 by using Qs in order to obtain a configured QoS setting (Qc) equal to Qs. Note that Qs is a representation of QoS of NAS while Qc is a representation of QoS of AS. The AS 112 reports Qc to the WQM unit 14 (step S202). Then, the process goes to the QoS management step (step S204).

If the wireless access network 2 can achieve the QoS request, the wireless access network 2 maps Qr to a corresponding wireless interface channel configuration which is further analyzed by the AS 112 of the mobile terminal 1. An analysis result is reported to the CN 3. Next, the CN 3 sends the QoS request to the NAS 111. The NAS 111 then notifies the MMI unit 12 or the upper layer unit 13 of the QoS result by, for example, showing on the display of a cellular phone. Also, the NAS 111 will notify the WQM unit 14 of the QoS result (step S203). Then, the process goes to the QoS management step (step S204).

In step S204, the AS 112 analyzes the wireless interface channel configuration for reporting associated parameters or measured data to the WQM unit 14. For example, the AS 112 reports an actual QoS (Qm) (step S205). If the WQM unit 14 finds that Qm is larger than Qc but smaller than or equal to Qr, the WQM unit 14 will submit a request about changing QoS to the NAS 111 in order to obtain an improved QoS (step S206).

Alternatively, if Qm is smaller than Qc, the WQM unit 14 will report the current Qm to the MMI unit 12 or the upper layer unit 13 in which the current Qm is poorer than Qc. As such, it is possible of informing user of modifying the requested QoS to a lower one (step S207).

If Qm is larger than Qc and Qr, the WQM unit 14 will take Qr to modify QoS. That is, the user can request a QoS better than Qr to the CN 3 via the MMI unit 12 or the upper layer unit 13 (step S208).

Moreover, in the QoS management step, the user may set a new QoS request (Qr') via the MMI unit 12 or the upper layer unit 13. The Qr' is then sent to the WQM unit 14 (step S209). The WQM unit 14 will compare Qm (obtained by the AS 112) with Qr' for determining whether Qm is larger than Qr'. If Qm larger than or equal to Qr', the WQM unit 14 will request the NAS 111 for modifying QoS based on Qr' (step S210).

Alternatively, if Qm is smaller than Qr', the WQM unit 14 will report the current Qm to the MMI unit 12 or the upper layer unit 13 in which the current Qm is poorer than Qr'. As such, it is possible of informing user of modifying the requested QoS to a lower one (step S211). The process will return to step S204 for looping after performing one or more steps of the steps from S206 to S211 until an end of service request is received from the WQM unit 14 (step S212).

Although the present invention has been explained in relation to its preferred embodiment, it is to be understood that many other possible modifications and variations can be made without departing from the spirit and scope of the invention as hereinafter claimed.

What is claimed is:

1. A method for managing QoS of a mobile terminal comprising the steps of:
   (A) sending a QoS request to a network for requesting the network to provide a first QoS;
   (B) if the network can not provide the first QoS, performing a channel analysis by a second QoS evaluated and set by the network for obtaining a channel analysis result and executing step (D);
   (C) if the network can provide the first QoS, the mobile terminal performing the channel analysis based on a wireless interface channel configuration corresponding to the first QoS for obtaining a channel analysis result; and
   (D) entering into a QoS management state until an end of service request is received, wherein a QoS change request in the QoS management state is generated if there is received an actual QoS larger than the second QoS but smaller than or equal to the first QoS.

2. The method as claimed in claim 1, wherein if the actual QoS is smaller than the first QoS, the actual QoS is reported.

3. The method as claimed in claim 1, wherein if the actual QoS is larger than both the first QoS and the second QoS, the mobile terminal will submit a QoS change request.

4. The method as claimed in claim 1, wherein, in step (D), if there is set a new QoS smaller than the actual QoS, a QoS change request with the new QoS is generated.

5. The method as claimed in claim 1, wherein, in step (D), if there is set a new QoS larger than or equal to the actual QoS, the actual QoS is reported.

6. The method as claimed in claim 1, wherein the network comprises a wireless access network and a core network.

* * * * *